Feb. 14, 1933.    W. H. O'BRIEN    1,897,673
MEANS FOR PRODUCING MOTION PICTURES
Filed April 16, 1928    3 Sheets-Sheet 2
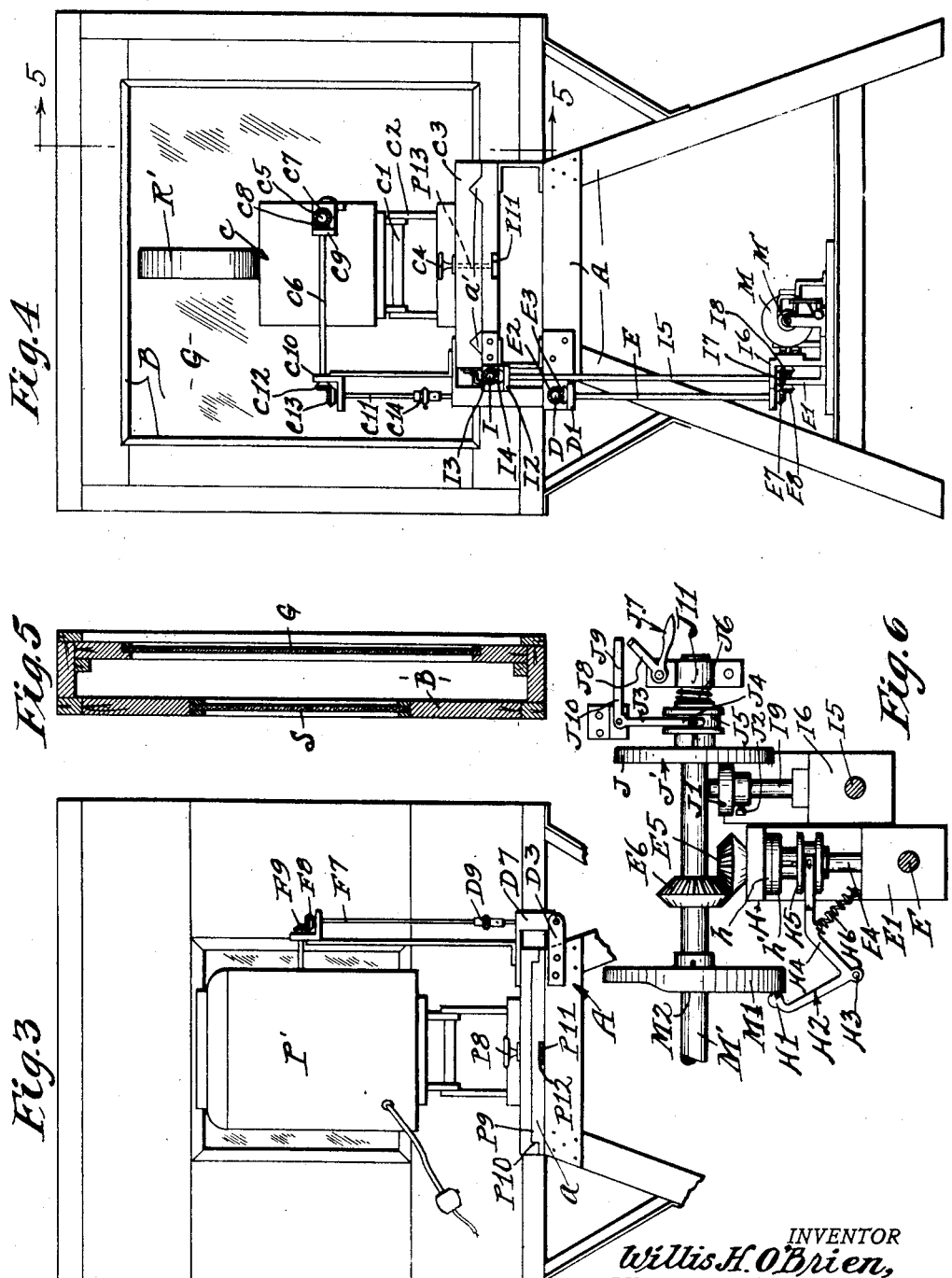
INVENTOR
Willis H. O'Brien,
BY
ATTORNEY Feb. 14, 1933. W. H. O'BRIEN 1,897,673
MEANS FOR PRODUCING MOTION PICTURES
Filed April 16, 1928  3 Sheets-Sheet 3
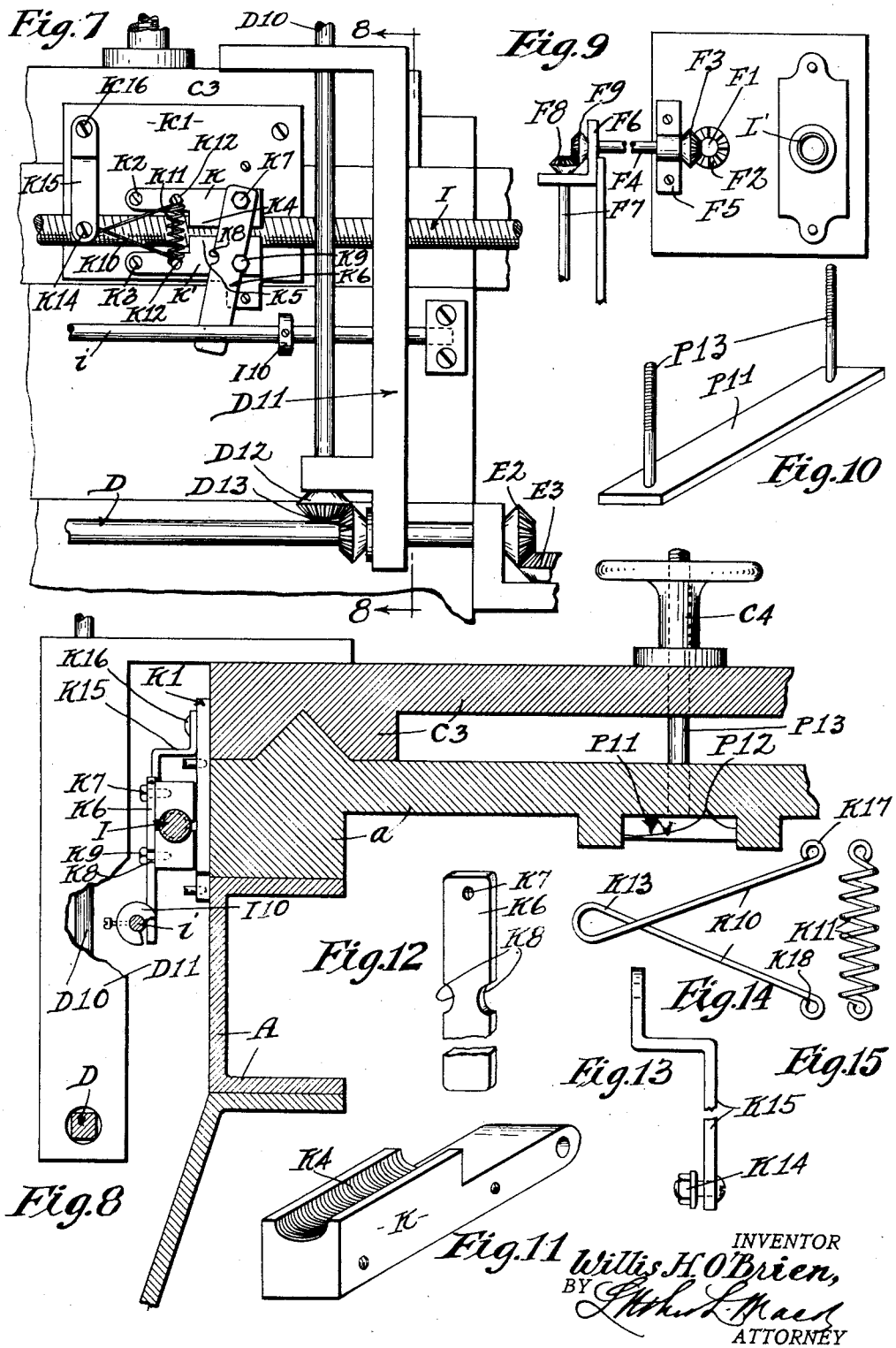

Patented Feb. 14, 1933

1,897,673

UNITED STATES PATENT OFFICE

WILLIS H. O'BRIEN, OF LOS ANGELES, CALIFORNIA

MEANS FOR PRODUCING MOTION PICTURES

Application filed April 16, 1928. Serial No. 270,336.

The invention relates to means for producing motion pictures and particularly to means for producing composite motion pictures wherein a plurality of scenes are combined into a single picture. The invention provides a translucent screen having a camera and projector at opposite sides thereof and synchronously operated. The camera photographs the picture projected on the screen by the projector as well as complemental scenes which may be painted on that screen. An object of the invention is to facilitate, with that arrangement, the taking of running shots. This is accomplished by providing a common source of power for moving the camera towards the screen and for advancing the film through the camera.

Many other objects and effects will appear from the detailed description of my invention hereinafter following. I have shown a preferred form of invention in the accompanying drawings, in which:

Fig. 3 is an end view of the machine shown in Fig. 1 showing the projecting mechanism;

Fig. 4 is an end view of the same showing the camera and means for operating the same;

Fig. 5 is a sectional elevation of the subjective screen and glass on which the projected and painted scenery are respectively produced, together with a suitable mounting and enclosure therefor;

Fig. 6 is a sectional plan of the operating mechanism as viewed from line 6—6 of Fig. 1;

Fig. 7 is an enlarged fragmentary elevation of the camera operating mechanism shown in Fig. 1;

Fig. 8 is a section of the camera mechanism on line 8—8 of Fig. 7;

Fig. 9 is a fragmentary elevation of the projecting mechanism on line 9—9 of Fig. 1;

Fig. 10 is a perspective view of a clamping member by means of which the camera and projector are adjustably held on the frame;

Fig. 11 is a perspective view of one of a pair of clutch members arranged to operably connect the camera with a perambulating mechanism by means of which the camera is moved in the direction of the subjective scene during a photographing operation;

Fig. 12 is a view of a clutch operating member;

Fig. 13 is a view of a bracket, and

Figs. 14 and 15 are views of springs mounted on said bracket for regulating the tension of the clutch members.

In accordance with the objects of invention hereinbefore named, the machine arranged to attain said objects embodies, a frame A having a bed $a$ on which are mounted a projector P, and a camera C at or near opposite ends of the bed, and an intermediate case B which carries and encloses a subjective screen S and a sheet of plate glass G.

Figure 1:
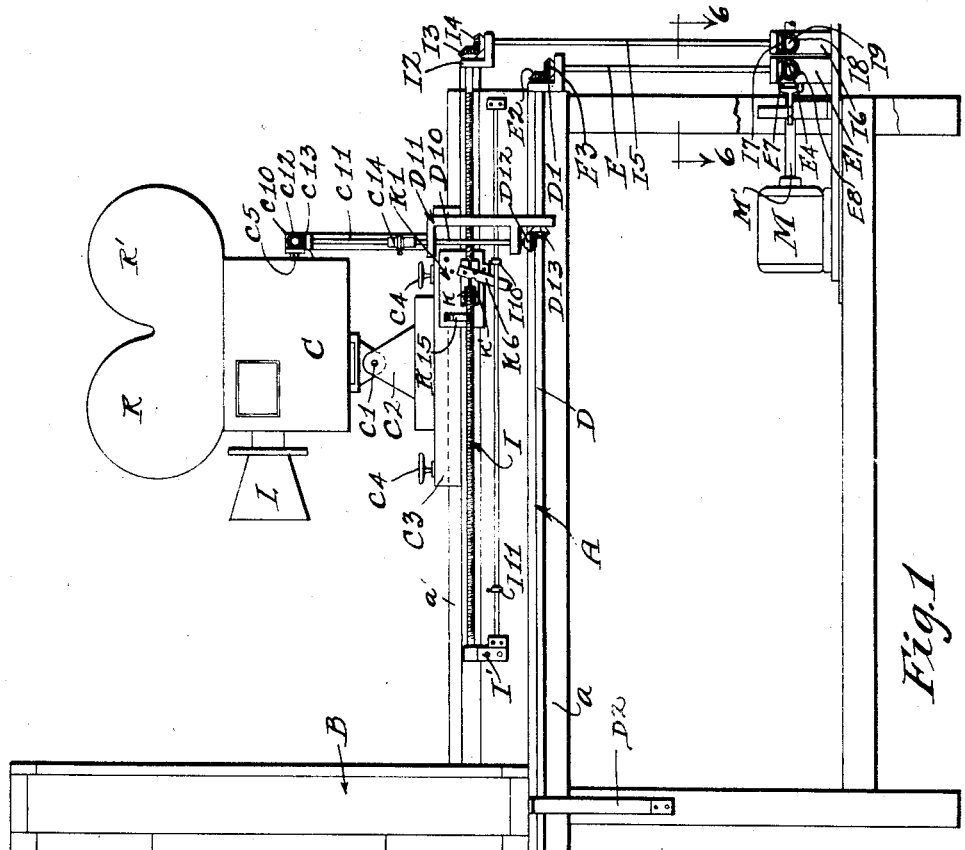
Fig. 1 is a side elevation of a machine particularly adapted for producing motion pictures in accordance with my invention.
Figure 2:
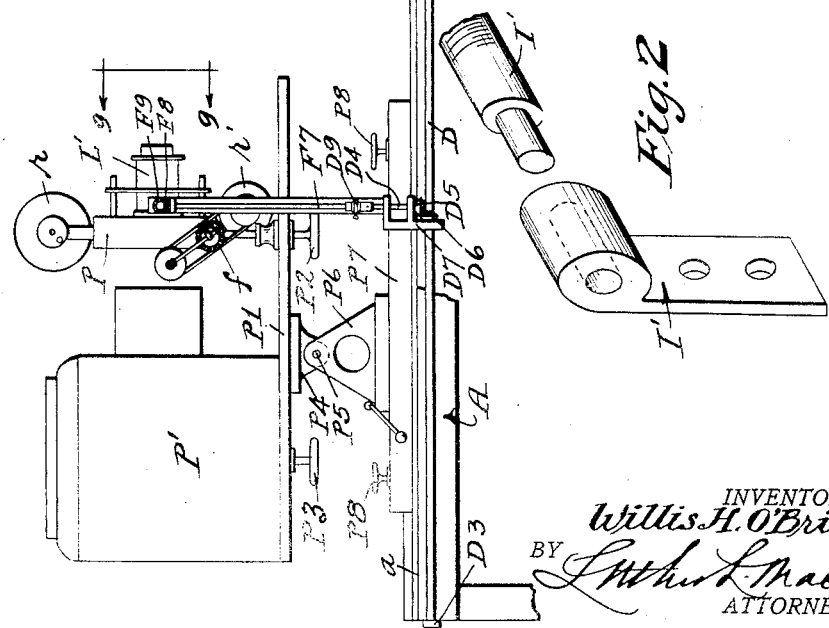
Fig. 2 is a perspective view of a bearing and screw for automatically moving the camera in the direction of the subjective scenery during the taking of a picture.

The projector P is adjustably mounted on a base P1 which also carries a lamp housing P', both of which elements are adapted to be adjusted independently on the base P1 by means of hand wheels P2 and P3. Base P1 has a bracket P4 which is pivotally mounted at P5 on a bracket P6 attached to a slide P7 which is longitudinally adjustable on the bed $a$ of frame A, as shown in Fig. 1. The bed $a$ has a longitudinal tongue P9 and the slide P7 has a corresponding groove P10 which serve to guide the projector longitudinally on the frame A in the direction of or away from the case B. A plate P11 is movably disposed in a groove P12 on the lower side of the bed $a$ and has vertical pins P13, P13 thereon which carry hand wheels P8, P8 above the upper surface of the slide P7. Said pins may extend through suitable slots, not shown, in the bed $a$ and the hand wheels are threaded on the pins so as to clamp the slide in selected positions on the bed. Thus the projector is capable of adjustment longitudinally on the bed and tiltably on the slide for properly positioning the lens L' of the projector with respect to the screen S.

The projector P carries reels $r$ and $r'$ on which a subjective film is movably supported behind the lens L' in a projecting operation. A suitable mechanism $f$ is provided in connection with the projector for moving the film and includes an operating shaft F1 which projects from the front of the projector and carries a bevel gear F2 adapted to mesh with a similar gear F3 which is carried on a horizontal shaft F4. A pair of bearings F5 and F6 rotatably support the shaft F4 and the member F6 also supports the upper end of a vertical shaft F7 on which a bevel gear F8 is held and meshes with a similar gear F9 on the outer end of shaft F4.

The bed $a$ supports an elongated horizontal shaft D which is journaled in bearings D1, D2 and D3 attached to one side of the frame A and is adapted to operate the projector and camera from a single source. Shaft D is operably connected with the shaft F7 by means of a short shaft D4 carrying a bevel gear D5 on its lower end and a similar gear D6 which is slidably connected with shaft D. Shaft D4 is carried in a bracket D7 and is adjustably connected with the shaft F7 by means of a coupling D9, as shown in Fig. 1.

Thus the sliding of the bracket D7 and gear D6 on shaft D when the projector P is tilted and the adjustment of shaft F7 in the coupling D9, will permit the operation of the mechanism $f$ from the shaft D.

The case B is preferably fixed in its position on the bed $a$ but may be adjustable if desired. Said case is arranged to support a translucent screen S of ground glass, thin rubber or other suitable material, in position transversely of the bed $a$ and within the range of the lens L'. The glass G is mounted in the case in spaced relation to the screen S for ordinary purposes but may be nearly if not quite in contact with the screen under certain conditions. Both the glass and screen are preferably removable at will from the case, and the case B is light proof except through the screen and glass.

The camera C is mounted on the bed $a$ in a manner typical of the projector and is adjustable longitudinally and pivotally. To this end the camera is pivotally connected at C1 with a base C2 which is attached to or formed on a slide C3 adapted to be adjusted longitudinally on the bed $a$ and clamped by means of the hand wheels C4, C4 and the clamping plate P11, as shown in Fig. 10. Base C3 is grooved, as shown in Fig. 8, to receive tongues as at $a'$ on the bed $a$.

The camera is connected with the drive shaft D so as to operate synchronously with the projector P. Thus the operating shaft C5 connects with a transverse shaft C6 by means of a pair of bevel gears C7 and C8 on shafts C5 and C6, respectively. Shaft C6 is held in brackets C9 and C10 near its opposite ends and the bracket C10 also supports the upper end of a vertical shaft C11 which transmits motion to shaft C6 by means of a pair of bevel gears C12 and C13, on shafts C6 and C11, respectively. Shaft C11 has an adjustable coupling C14 by means of which it is connected with a shaft D10 which is carried in a bracket D11 and is adapted to be operated from drive shaft D by means of a pair of bevel gears D12 and D13 carried on shafts D10 and D, respectively. Bracket D11 and gear D13 are slidable on shaft D to permit the tilting and longitudinal adjustment of the camera C, as in the case of the projector P.

In the operation of the machine embodying the synchronized camera and projector it may be understood that the films are not run continuously as in other photographing and projecting operations, but are operated intermittently, frame by frame, with sufficient time exposures to produce satisfactory effects. The films, however, are run at synchronized speeds so that the pictures from the successive frames on the subjective film will be projected on the screen S and photographed on corresponding frames of the negative film. It is necessary, therefore, to provide an intermittent driving mechanism for the shaft D. Such a mechanism is shown in Figs. 1 and 6 and comprises a vertical shaft E at the end of the frame A which is journaled in the bracket D1 at its upper end and in a bracket E1 at its lower end. Bevel gears E2 and E3 connect the adjacent ends of shafts D and E and similar gears E7 and E8 connect shaft E with a short horizontal shaft E4 on the bracket E1.

Shaft E4 is arranged for intermittent connection with a motor M by means of a friction or jaw clutch device H carried on the bracket E1 and composed of associated members $h$ and $h'$. Member $h'$ is shiftable on and rotatable with shaft E4 while member $h$ is continuously rotatable by means of a pair of bevel gears E5 and E6 connecting the member $h$ and the motor shaft M', respectively. Shaft M' carries a cam M1 which has a face M2 adapted to be engaged by an arm H1 of a follower H2 which is pivoted on the frame A at H3. The follower H2 has a yoke H4 which engages a grooved collar H5 on shaft E4 for the purpose of shifting the member $h'$ into and from engagement with the clutch member $h$, corresponding to the contour of the cam surface M2. A spring H6 serves to hold the clutch normally disengaged. Necessarily the duration of the engagement between the clutch members $h$ and $h'$ is sufficient to operate the camera C and the projector P to an extent equal to one frame on the film of each of said elements.

When it is desired to change the picture from a remote to a close-up view of the projected scenes, such a change may be automatically made in a gradual manner and to a desired extent, as shown in Figs. 1 and 6, by mechanism which serves to impart to the camera C a perambulatory motion relative to the subjective screen S. For this purpose I provide a longitudinally disposed rotatable screw I on the bed $a$ and above the drive shaft D which is journaled at its inner end in a bearing I' attached to the bed $a$ and at its outer end in a bracket $I^2$.

The screw I is operated by means of a pair of bevel gears $I^3$ and $I^4$ on screw I and a vertical shaft $I^5$ which is journaled at its upper end in the bracket $I^2$ and at its lower end in a bracket $I^6$. Shaft $I^5$ is connected with a short horizontal shaft $I^9$ on bracket $I^6$ by means of a pair of gears $I^7$ and $I^8$ carried on shafts $I^5$ and $I^9$, respectively.

The outer portion of the motor shaft M' carries a sliding driving disc J with a frictional inner surface J' which is adapted to be engaged by a friction roller $J^1$ adjustably held on the shaft $I^9$. The disc J is continuously rotatable during the operation of the motor and the roller $J^1$ is adjustable on the face of the disc so as to vary the speed and direction of the shafts $I^9$, $I^5$ and the screw I, this adjustment being accomplished by means of a set screw $J^2$ which serves to hold the roller $J^1$ in selected position. Disc J is normally held in frictional engagement with the roller $J^1$ by means of a bell crank $J^3$ which has a yoke $J^4$ engaging a grooved collar $J^5$ on the disc. A spring $J^6$ serves to urge the disc into frictional engagement with the roller. Said spring is interposed between collar $J^5$ and a bearing $J^{11}$ for shaft M'. The bell crank $J^3$ may be operated so as to hold the disc J out of engagement with the roller $J^1$ by means of a lever $J^7$ having an arm $J^8$ thereon adapted to seat in a notch $J^9$ in the arm $J^{10}$ of the bell crank.

Thus the camera perambulating mechanism may be held inoperative during the operation of the camera and the projector when and if desired, but the camera may be moved relative to the screen S at selected speeds and for desired distances by means of the mechanism shown in Figs. 1 and 7. This mechanism embraces a pair of oppositely positioned members K and K' which are arranged one above the other on and are pivotally attached to a plate $K^1$ attached to the camera slide C3. Said members are pivotally held on screws K2 and K3, respectively, and have extensions K4 and K5 with threaded recesses therein adapted to engage opposite portions of the screw I. Member K has a depending arm K6 pivotally held thereon at K7 and provided with notches K8, K8 on its opposite edges, as shown in Fig. 12. Said notches are adapted to be engaged by a pin K9 on the member K' for holding the members K and K' in operative engagement with the operating screw I, against the tension of springs $K^{10}$ and $K^{11}$. Spring $K^{11}$ connects at its opposite ends with the members K and K' by means of screws $K^{12}$, while spring $K^{10}$ has a central loop $K^{13}$ held on a screw $K^{14}$ in an end of a bar $K^{15}$ which is attached to the plate $K^1$ at $K^{16}$. The two arms of spring $K^{10}$ terminate in eyes $K^{17}$ and $K^{18}$ which hook over the screws $K^{12}$. A horizontal rod $i$ is fixedly mounted on bed $a$ and has a pair of stop collars $I^{10}$ and $I^{11}$ near the opposite ends thereof which are adjustable on the rod and are disposed in the path of the arm K6, for the purpose of limiting the movement of the camera C at opposite ends of its movement.

Thus when the camera C is traveling to the left, as shown in Fig. 1 the arm K6 will be set the reverse of the position shown in Fig. 7 so that the notch K8 on the other side will engage the pin K9, and when the camera reaches a predetermined position, the arm K6 will engage the collar $I^{11}$ and disengage the arm from the member K', thus permitting the tension of spring $K^{10}$ to spread the members K and K1 apart so that they will be disengaged from the rotating screw I.

When screw I is rotated in a reverse direction by changing the relation between the friction disc J and the roller $J^1$ the engagement of the arm K6 with the collar $I^{10}$ will similarly operate to disengage the members K and K' from the screw and stop the movement of the camera.

It will be understood that either scenery or action, or both, may be projected on the screen S by means of the projector P, and that artificial scenery which is complemental to the projected scenery is painted on the glass G, for producing a composite scene. This is accomplished by initially projecting a scene from the subjective film of the projector P on the screen S, then viewing the scene through the glass G through the lens L of the camera. The outlines of the artificial scenery to be painted on the glass G are then marked on the glass and the artificial scenery on the glass is arranged to match in color values with the projected scenery on the screen S. That portion, or those portions of the glass G within the outlines of the artificial scenery remain transparent and form areas through which may be photographed the projected scenery on the screen S. Thus artificial and fanciful settings may be painted on the glass as a background for a proposed picture, and scenes of action which may have been photographed in foreign or remote settings and with a different background may be merged into a single new picture.

Also action may be photographed in a locality remote from a studio while the composite picture embodying that particular action may be produced in a laboratory at a substantial economy in cost of production. The glass G is preferably larger than the screen S for the purpose of providing elaborate and enlarged backgrounds for the pictures. In projecting the scenes on the screen S the shutter is removed from the projector so that the light on the screen will be continuous. while the shutter on the camera protects the sensitized film of the camera from the light during the movement of the film through the projector from reel R to reel R'.

Usually the perambulatory movement of the camera is desired only for changing the picture from a remote to a close-up exposure of the scenes on the screen S, in which case the glass G will be transparent throughout its area, but a composite picture may be made in which an exposure is changed from a remote to a close-up, or vice versa, by moving the glass into close contact with the screen S or by automatically or manually changing the focus of the camera lens L as the camera moves in the direction of or away from the screen.

It is obvious that at each revolution of the cam $M^1$ the subjective and negative films will be simultaneously moved one frame each and will thereafter remain at rest until a further rotation of said cam, and the speed of the cam may be so established that a proper interval of exposure is provided for each frame.

What I claim, is:

1. A photographic machine comprising a camera, means for movably supporting the camera relative to subjective matter to be photographed, a power operating mechanism, means for connecting the camera with the power mechanism for intermittently moving the sensitized film therethru, and means also connected with the power mechanism and arranged for connection at will with the camera for varying the distance of the camera relative to the subjective matter in a photographing operation.

2. A photographic machine comprising a frame, a moving picture projecting machine and a camera adjustably mounted thereon in photographic opposition, a fixed screen intermediate the camera and the projecting machine and mounted in said frame, a power operated mechanism connected with and for synchronously operating the camera and the projecting machine, and means for operatively connecting said camera with said power operated mechanism for moving the camera relative to said screen in a photographing operation.

3. A photographic machine as characterized in claim 2, including means for adjusting the projecting machine relative to the screen.

4. A photographic machine as characterized in claim 2, including means for adjusting the projecting machine relative to the screen, and means for limiting the opposite extremes of movement of the camera.

5. A photographic machine comprising a frame, a projecting machine mounted for adjustment longitudinally on said frame, a camera also longitudinally movable on said frame and in photographic opposition to the projecting machine, a housing intermediate the camera and the projecting machine provided with a translucent screen adjacent the projecting machine and a transparent element adjacent the camera and contiguous to said screen, a power operated mechanism on said frame including a longitudinal drive shaft connected with and for synchronously operating said camera and said projecting machine, a rotatable screw mounted on said frame and associated with the camera, and means operable at will for connecting the camera with said screw whereby the camera may be moved relative to said transparent element in a photographing operation.

6. A photographic machine as characterized in claim 5, including means for limiting the movement of said camera in opposite directions.

WILLIS H. O'BRIEN.